United States Patent [19]

Perna

[11] Patent Number: 4,705,711
[45] Date of Patent: Nov. 10, 1987

[54] POLYIMIDE COVERED CALENDER ROLLS

[75] Inventor: Dominic R. Perna, Wilmington, Del.

[73] Assignee: E. I. Du Pont de Nemours and Company, Wilmington, Del.

[21] Appl. No.: 811,715

[22] Filed: Jan. 30, 1986

[51] Int. Cl.⁴ .................. B32B 3/00; B32B 15/08; B32B 27/06

[52] U.S. Cl. .................. 428/141; 428/155; 428/438; 428/473.5; 29/121.1; 29/121.2; 29/132; 29/DIG. 23

[58] Field of Search .......... 428/141, 155, 458, 473.5; 427/130; 29/121.1, 121.2, 132, DIG. 23; 72/703

[56] References Cited

U.S. PATENT DOCUMENTS

| | | | |
|---|---|---|---|
| 2,720,119 | 10/1955 | Sherman | 29/DIG. 23 |
| 3,179,631 | 4/1965 | Endrey | 51/298 |
| 4,100,326 | 7/1978 | Somezawa et al. | 427/130 |
| 4,128,673 | 12/1978 | Wantanabe et al. | 427/130 |
| 4,242,783 | 1/1981 | Wantanabe et al. | 29/132 |

Primary Examiner—John E. Kittle
Assistant Examiner—Susan S. Rucker

[57] ABSTRACT

Calender roll comprising a cylindrical metal shaft bearing a polyimide cover, wherein the shaft is knurled to eliminate slippage between the shaft and the cover.

1 Claim, 2 Drawing Figures

POLYIMIDE COVERED CALENDER ROLLS

BACKGROUND OF THE INVENTION

In magnetic tape production, a calendering step is required to smooth and flatten the magnetic coating on a base film. The calendering step involves multi-roll assemblies consisting of alternating steel and complaint rolls. The steel rolls are typically chrome plated and polished to a finish of less than 1 microinch AA. The steel rolls are generally heated during operation by means of a heat transfer fluid circulated through the interior of the rolls.

The compliant rolls used in the calendering step are generally prepared from a steel shaft with a relatively soft cover. Cover materials typically used for compliant rolls in such a calendering operation include nylon 6 and compressed paper. These materials have demonstrated a combination of hardness, machinability and surface finish that make them useful in calendering operations. However, each has demonstrated certain disadvantages. For example, while nylon can be polished to a satisfactory surface finish, its maximum operating temperature is about 60° to 70° C., above which subsurface melting and surface blistering can occur. While paper can be operated at somewhat higher temperatures, the best surface finish obtainable is approximately 6 microinches AA. In addition, paper roll covers are somewhat more difficult to assemble.

Polyimide resin, when formed to a tubular configuration, provides a roll cover material which combines the advantages of nylon and paper roll covers previously used, but without the disadvantages of each that had been encountered. Such polyimide roll covers can operate above the temperature limit of other polymeric materials without significant changes in properties. In addition, polyimides exhibit a hardness comparable to nylon and can be polished as smoothly as nylon covers.

Despite these inherent advantages to polyimide roll covers, and despite shrink fit assembly techniques with a metal shaft, rolls covered with polyimide resin, in operation, exhibit slippage between the cover and shaft. Slippage is particularly undesirable in calender roll operations, since the debris generated at the interface between the shaft and the cover may be a source of contamination in the process.

SUMMARY OF THE INVENTION

The instant invention provides an improved polyimide covered roll which, in operation, eliminates the slippage previously encountered between the shaft and the cover.

Specifically, the instant invention provides, in a cylindrical metal shaft bearing a polyimide cover, the improvement wherein the shaft is knurled with a diamond or straight pattern to a depth of about from 0.001 to 0.005 inches, where the product of the knurl diametral pitch and the depth of knurl on the shaft in inches is about from 0.15 to 0.32, and the interference between the polyimide cover and the shaft is about from 0.003 to 0.0085 inches per inch of shaft diameter.

DETAILED DESCRIPTION OF THE INVENTION

Figure 1:
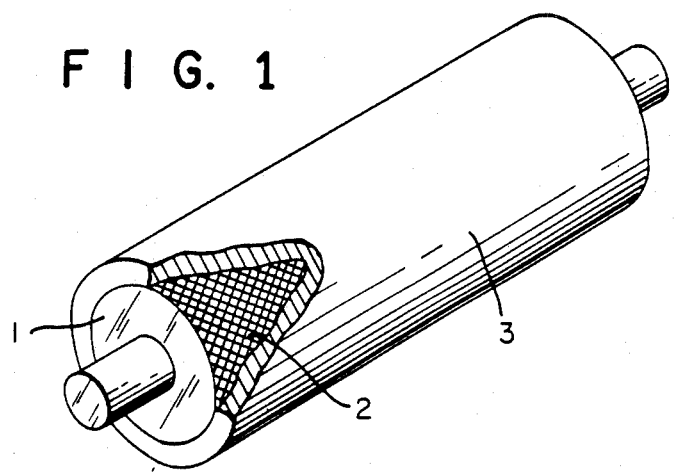
FIG. 1 is a perspective view of a covered roll of the present invention with the cover partly cut away.

The calender rolls of the present invention comprise a metal shaft with a polyimide cover. The cylindrical shaft in the present invention is generally about from 4 to 16 inches in diameter, and is typically prepared from carbon steel or a steel alloy. The roll has a diamond or straight shaped pattern knurled into the surface by conventional techniques, typically with a diametral pitch of about from 64 to 160, as specified by ANSI standard B 94.6 - 1981. In the knurled pattern on the shaft the product of the knurled diametral pitch and the depth of the knurl on the shaft in inches is about from 0.15 to 0.32. The knurling on the surface of the roll is such as to provide a depth of the knurled pattern of about from 0.001 to 0.005 inches. In operation, the diamond knurling pattern on the metal shaft prevents both circumferential as well as side to side movement of the polyimide cover. The straight knurling pattern on the metal shaft prevents circumferential movement of the cover, and side to side movement can be restricted by flanges at the ends of the roll or any equivalent means.

Polyimides which can be used for the covers in the present invention include those previously described in Endrey, U.S. Pat. No. 3,179,631, hereby incorporated by reference.

The polymeric resin powder obtained as described in the Endry patent can be formed into a tubular configuration by techniques previously used in the art. Specifically, in the preparation of a tubular shape from the polyimide resin, the dry, flour-like polyimide powder is first loaded into a fixture and hydrostatically compacted to produce a "preform" or "green" tube. The tubular shape can be prepared in a mold consisting of an outer die or mold and an inner mandrel, with a base plate used to attach the outer mold to the mandrel. A rubber bag is attached to the lower outer diameter of the mandrel and folded over the top of the outer die, forming a closed volume between the outer diameter of the bag and the inner diameter of the outer die. The closed volume is then evacuated to pull the rubber bag against the inner wall of the die. The resulting annular volume between the inner surface of the rubber bag and the mandrel is filled with polyimide powder, the vacuum released, and the bag then sealed to the outer diameter of the mandrel. The polyimide powder is thereby held in an annular configuration between the rubber bag and the mandrel.

The entire mold assembly is then placed inside a pressure vessel. The vessel is sealed, filled with water, and pressurized to about from 8,000 to 14,000 psig, and preferably about 10,000 psig. The resin is compacted against the inner mandrel forming a preform or "green" tube having limited mechanical strength and a specific gravity of about from 1.1 to 1.3. The mold assembly is removed from the pressure vessel and disassembled to recover the preform.

The preform is then heat treated and sintered to improve its mechanical properties. The preform is first suspended in a nitrogen vapor within a pressure vessel, and then heated to a temperature of about 340° C. under vacuum to extract residual solvents and moisture. Typically, the preform is maintained at the elevated temperature for a period of about from 7 to 14 hours. Upon completion of the heat treating cycle, the preform is submerged into molten lead bismuth. The lead bismuth permits the application of pressure to the entire surface of the preform, since the molten metal does not penetrate the somewhat porous surface of the preform. It is then heated to a temperature of about 430° C. while being pressurized to 15,000 psig. The preform is maintained at a temperature of 430° C. and a pressure of 15,000 psig for one hour, after which the pressure is released and the temperature is lowered.

After removal from the lead bismuth bath, the thin coating of lead bismuth remaining is removed from the molded tube with an acid bath. The molded tube is then machined to its final configuration for installation on the metal shaft. The outer diameter of the tube, after installation on the shaft, is polished for use as a calender roll.

The inner diameter of the polyimide tube is designed to provide an interference of about from 0.003 to 0.0085 inch per inch of shaft diameter. Interferences of less than 0.003 inch per inch of shaft diameter will not be sufficient to prevent slippage, between the shaft and the cover, at operating temperatures. Interference levels greater than 0.0085 inch per inch of shaft diameter can result in fracture of the polyimide material.

The machined polyimide tube is heated, either in an air oven or oil bath, to a temperature at which the inner diameter of the tube expands to permit assembly over the shaft. In general, the polyimide tube should be heated to a temperature of about from 250° to 600° F. Heating should be conducted at a gradual rate to avoid excessive thermal stresses within the cover wall. In general, a heating rate of up to about 5° F. per minute has been found to be satisfactory. In the event that an air oven is used to heat the polyimide tube, it is desirable to insulate the outer surface of the tube with, for example, a one inch thickness of fiberglass, to prevent thermal shock when the tube is removed from the oven for assembly. The ends of the tube should not be insulated or blocked so that the inner diameter can be heated. The tube is preferably maintained at the assembly temperature for a period of about from 16 to 24 hours to equilibrate the temperature of the cover wall. Thereafter, the cover is removed from the oven or heating tank and slipped over the shaft. In general, it is not necessary to heat or cool the shaft prior to assembly.

Immediately after applying the cover to the shaft, the assembly should be either insulated or returned to the heating chamber for slow cooling. In general, the cooling rate will vary with the cover wall thickness, and should be about from 0.43° F. to 50° F. per hour, depending on cover geometry. In general, thin covers can be cooled at a substantially faster rate than thicker covers. The cool down rate can be adjusted, as will be evident by those skilled in the art, so as to prevent thermal stresses in the polyimide material from exceeding 25% of the material strength.

After cooling the final assembly, the cover is lathe cut to make it concentric with the shaft, and the cover ends are face cut to allow for future axial growth. To prevent chipping the cover and initiating crack failure, only light cuts of about 0.03 inches at a fine feed setting should be used. The outer surface of the cover is then polished using conventional fine sanding and polishing media to a 2 microinch AA finish.

Figure 2:
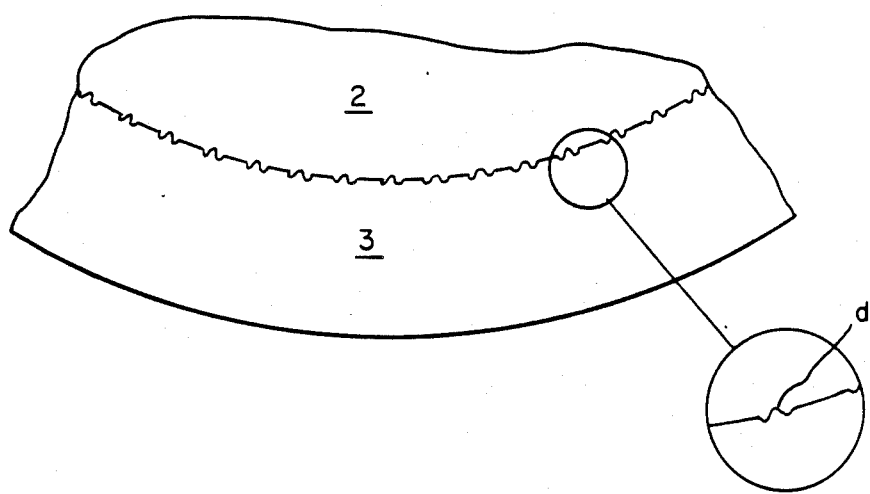
FIG. 2 is an end cross-sectional view of a portion of the interface between the shaft and the cover.

The calender rolls of the present invention are further illustrated in FIG. 1, in which shaft 1 is knurled with diamond pattern 2 on its surface, and covered with polyimide layer 3. In FIG. 2, the interface between the knurled surface and the cover is shown, in which the cover 3 interferes with the knurled pattern 2 by a distance d which is about from 0.003 to 0.0085 inches per inch of shaft diameter.

The calender rolls prepared according to the present invention maintain their load carrying capability at temperature extremes, and exhibit low thermal conductivity and excellent machinability with standard machining techniques.

When used as calender rolls for magnetic tape production, the present rolls permit the production of high grade, commercial video tape at operating conditions beyond the capability of either nylon or paper roll covers. The present rolls can be used at temperatures of 100° C., with nip loadings of up to 2000 lbs. per inch and line speeds of up to 500 feet per minute without material failure. Magnetic tape produced with these rolls requires fewer calender stack nips than are required using nylon rolls covers. In the alternative, with the same number of nips, a higher quality tape can be produced using the rolls of the present invention than when using the same number of nylon or paper covers for the calender rolls.

Particularly in view of the difficulties involved in applying a polyimide roll cover to a smooth surface, it is surprising that the presently defined shaft surface would give a satisfactory calender roll suitable for use in the manufacture of magnetic recording media. Polyimide resin functions well as a bearing and bushing material, and the characteristics that make polyimide resins desirable in this application also contribute to the slippage when a tube of polyimide resin is applied to a metal shaft. Moreover, the slippage in earlier assemblies of a polyimide tube over a metal shaft resulted in the generation of debris at the interface of the shaft and cover, and presented a source of contamination for the product being treated. It would normally be expected that any increased roughness of the shaft would further contribute to the generation of debris at the interface between the cover and shaft, adding to the contamination of the treated product. In the alternative, if sufficient surface roughness were imparted to the underlying shaft to prevent movement, the frangible polyimide cover would be likely to crack. Accordingly, the present invention represents a unique balancing of surface roughness on the shaft and interference between the shaft and cover surfaces that obtains the benefit of the polyimide cover with no slippage between the cover and the roll, no generation of debris at the interface between the cover and the roll and without fracture of the polyimide structure.

The present invention is further illustrated by the following specific examples.

EXAMPLE 1

A covered roll was prepared using a carbon steel shaft having a 64 diametral pitch diamond knurl formed into the surface at a depth of 0.004 inches. The product of the knurl diametral pitch and the depth of knurl is 0.26. A polyimide tube cover, using resin prepared according to Endrey, U.S. Pat. No. 3,179,631 and the procedure described above, was fabricated. The cover had an internal diameter of 6.851 inches, providing an interference between the knurled surface of the shaft, after shrink fitting, of 0.0074 inches per inch of shaft diameter.

The covered roll was tested as a calandar roll in the preparation of magnetic tape and found to exhibit excellent performance at a loading of 1200 PLI, a line rate of 450 feet per minute, and a tempertaure of 194°–203° F.

The roll was used in the treatment of 10,000,000 feet of magnetic tape with no sign of cover slippage.

CONTROL EXAMPLE A

The general procedure of Example 1 was repeated, except that the shaft, instead of the knurled surface, was ground to a roughness of about 16 microinches AA. The polyimide roll cover was applied using the same shrink fitting techniques. In operation, the roll covers were noted to continuously recede on the steel core, generating wear particles between the two surfaces.

CONTROL EXAMPLE B

If the procedure of Example 1 is repeated, except that the interference between the roll cover and the roll is 0.01 inches per inch of shaft diameter, the roll cover will fracture in the course of operation.

I claim:

1. In a cylindrical metal shaft bearing a polyimide cover, the improvement wherein the shaft is knurled with a diamond or straight pattern to a depth of about from 0.001 to 0.005 inches, wherein the product of the knurl diametral pitch and the depth of knurl on the shaft in inches is about from 0.15 to 0.32, and the interference between the polyimide cover and the shaft is about from 0.003 to 0.0085 inches per inch of shaft diameter.

* * * * *